United States Patent
Rohde et al.

(10) Patent No.: US 12,422,569 B2
(45) Date of Patent: Sep. 23, 2025

(54) METHOD FOR GENERATING A FEATURE-BASED LOCALIZATION MAP FOR A GNSS-BASED AND/OR FEATURE-BASED LOCALIZATION

(71) Applicant: Robert Bosch GmbH, Stuttgart (DE)

(72) Inventors: Jan Rohde, Stuttgart (DE); Marco Limberger, Ludwigsburg (DE)

(73) Assignee: Robert Bosch GmbH, Stuttgart (DE)

(*) Notice: Subject to any disclaimer, the term of this patent is extended or adjusted under 35 U.S.C. 154(b) by 593 days.

(21) Appl. No.: 17/813,512

(22) Filed: Jul. 19, 2022

(65) Prior Publication Data
US 2023/0025084 A1    Jan. 26, 2023

(30) Foreign Application Priority Data
Jul. 21, 2021  (DE) ............. 10 2021 207 769.2

(51) Int. Cl.
  *G01S 19/48*    (2010.01)
  *G01S 19/39*    (2010.01)
(52) U.S. Cl.
  CPC ............ *G01S 19/48* (2013.01); *G01S 19/396* (2019.08); *G01S 19/485* (2020.05)
(58) Field of Classification Search
  CPC ...... G01S 19/396; G01S 19/48; G01S 19/485; G06T 17/05; G06V 20/56; G06V 20/588; G06V 20/647; G06V 20/653
  See application file for complete search history.

(56) References Cited

U.S. PATENT DOCUMENTS

| | | | |
|---|---|---|---|
| 2003/0164796 A1* | 9/2003 | Needham | G01S 19/48 342/357.46 |
| 2015/0227775 A1* | 8/2015 | Lewis | G06V 20/56 345/419 |
| 2017/0010618 A1* | 1/2017 | Shashua | G06V 20/58 |
| 2017/0193829 A1* | 7/2017 | Bauer | G06T 17/05 |
| 2022/0092872 A1* | 3/2022 | Lee | G06V 10/25 |
| 2023/0112318 A1* | 4/2023 | Persson | G01S 19/396 701/1 |
| 2024/0069211 A1* | 2/2024 | Simon | G01S 19/485 |

FOREIGN PATENT DOCUMENTS

KR        101804471 B1 * 12/2017

* cited by examiner

*Primary Examiner* — Vladimir Magloire
*Assistant Examiner* — Fred H Mull
(74) *Attorney, Agent, or Firm* — Maginot, Moore & Beck LLP

(57) ABSTRACT

A method for generating a feature-based localization map for a global navigation satellite system (GNSS)-based localization and/or a feature-based localization includes generating feature information for the feature-based localization map using at least one GNSS information, generating GNSS-related meta-information that allows inferences to be drawn about a GNSS situation on which the generation of the feature information was based, and assigning the generated GNSS-related meta-information to the generated feature information.

8 Claims, 2 Drawing Sheets

METHOD FOR GENERATING A FEATURE-BASED LOCALIZATION MAP FOR A GNSS-BASED AND/OR FEATURE-BASED LOCALIZATION

This application claims priority under 35 U.S.C. § 119 to patent application no. DE 10 2021 207 769.2, filed on Jul. 21, 2021 in Germany, the disclosure of which is incorporated herein by reference in its entirety.

The disclosure relates to a method for generating a feature-based localization map for a GNSS-based and/or feature-based localization, and to a method for GNSS-based and/or feature-based localization. In addition, a computer program, a machine-readable storage medium and a localization device for a vehicle are specified. The disclosure can be applied in particular to GNSS-based localization systems for autonomous or semi-autonomous driving.

BACKGROUND

Feature-based localization maps, or so-called mapping techniques, are widely used to generate environmental maps from sensor observations for individual measurement vehicles or large fleets. Applications include robotics, logistics, automotive, aerospace, and consumer goods. Odometry, environmental sensor and GNSS measurements are often used to create feature-based localization maps.

The global navigation satellite system (GNSS) refers to a constellation of satellites that provide signals from space that transmit position and time data to GNSS receivers. The receivers then use this data to determine their location. GNSS systems are widely used in many application areas such as the automotive industry, surveying, avionics or agriculture, providing a cost-effective, continuous and global positioning solution. In order to meet the high requirements for accuracy, availability, and integrity in automated and assisted driving applications, it is common practice to process multi-GNSS (e.g. GPS, Galileo, Glonass or Beidou), multi-frequency signals while taking into account GNSS correction services in order to correct signal-in-space errors and to calculate an accurate and secure PVAT solution (position, velocity, attitude, time).

A feature-based localization system can determine the location of a surround-sensing-capable (sensors such as video, radar, or LIDAR) mobile device by decoding location coordinates from observable markers. In such a system, markers (for example, landmarks such as traffic signs, masts and/or traffic lane markings) are located at certain points in a locality. By measuring the viewing angle from the device to the marker, the device can estimate its own location coordinates in relation to the marker.

The fusion of vehicle pose estimates from different vehicle localization modalities is considered to be the state of the art. However, the state of the art does not adequately take account of the independence of the localization paths used. In particular, the use of GNSS for feature map creation can lead to the loss of independence of feature-based and GNSS-based localization.

SUMMARY

Here, a method is proposed for generating a feature-based localization map for a GNSS-based and/or feature-based localization, comprising at least the following steps: i) generating feature information for the feature-based localization map using at least one GNSS information item, ii) generating GNSS-related meta-information that allows inferences to be drawn about the GNSS situation on which the generation of the feature information was based, iii) assigning the GNSS-related meta-information generated in step ii) to the feature information generated in step i).

For example, steps i), ii) and iii) may be carried out at least once and/or repeatedly in the order indicated to carry out the method. Furthermore, steps i), ii) and iii), in particular steps i) and ii), can be carried out at least partially in parallel or simultaneously. This method is used in particular for generating a feature-based localization map for plausibility checking a GNSS-based and/or feature-based localization.

According to another aspect, a method for GNSS-based and/or feature-based localization is also proposed, comprising at least the following steps: a) receiving GNSS signals from GNSS satellites, b) reading in at least one feature information item from a feature-based localization map, wherein at least one GNSS-related meta-information item associated with the feature information is additionally read in, which allows an inference to be drawn about the GNSS situation on which the generation of the feature information was based, c) carrying out a GNSS-based and/or feature-based localization using the received GNSS signals and/or the at least one feature information item and taking into account the at least one GNSS-related meta-information item associated with the feature information.

For example, steps a), b) and c) may be carried out at least once and/or repeatedly in the order indicated to carry out the method. Furthermore, steps a), b) and d), in particular steps a) and b), can be carried out at least partially in parallel or simultaneously. The method can be used, for example, to localize a vehicle. The vehicle could be a car, for example, which is preferably configured for at least partially automated or autonomous driving. In principle, the localization can also be carried out using only one of the techniques (GNSS-based or feature-based). However, this is carried out in particular taking into account the at least one GNSS-related meta-information item associated with the feature information.

The described methods and the localization device described below each contribute in an advantageous way to improving, in particular ensuring, the independence of a GNSS-based and feature-based localization path. In a particularly advantageous way, this can be achieved here without excluding the use of GNSS data in the mapping. The method can be used, for example, to check the plausibility of a GNSS-based and/or feature-based localization.

The feature information can relate, for example, to a segment or extract of the feature-based localization map. The localization map is usually a digital map. It can store feature information as well as GNSS-related meta-information items associated with it.

The GNSS-related meta-information is suitable in particular for at least contributing to the description of the GNSS situation which was the basis for generating the feature information, or describing the situation. The at least one GNSS-related meta-information item can include one or more of the following (GNSS) information items (GNSS metadata): satellite type and constellation; satellite geometry (for example, DOP information); positioning type (code only, float ambiguity resolution, integer ambiguity resolution); only GNSS (and/or sensor fusion) position deviation information; percentage of discarded pseudo-range and carrier-phase measurements; RMS of the measuring residuals; variability of the residuals; signal-to-noise information; Multi-path display; and/or cycle slips (discontinuities in carrier-phase measurement).

According to an advantageous embodiment, it is proposed that the feature-based localization map was generated using the previously described method.

According to another advantageous embodiment, it is proposed that an evaluation of the trustworthiness of the localization result is carried out. In this context, it is also possible to determine the trustworthiness of the feature-based localization map. The trustworthiness of the localization result and/or the localization map can be determined, in particular, depending on the at least one GNSS-related meta information item associated with the feature information. For example, the trustworthiness can be provided in the form of an integrity measure, such as a so-called integrity level.

According to another advantageous embodiment, it is proposed that a measure of the independence of the GNSS-based localization from the feature-based localization is determined by also taking into account the at least one GNSS-related meta-information item associated with the GNSS signals. The measure of the independence of the GNSS-based localization from the feature-based localization can be advantageously (also) input into the trustworthiness assessment or form a basis for the trustworthiness assessment.

In this context, it is also preferable that the measure of the independence of the GNSS-based localization from the feature-based localization be determined by also taking into account at least one GNSS-related meta-information item associated with the GNSS signals. For example, the at least one GNSS-related meta-information item associated with the feature information and the at least one GNSS-related meta-information item associated with the GNSS signals can be compared. In other words, this can also be expressed in the following way, namely that a stored GNSS-related meta-information item relating to the feature information is compared with current GNSS-related meta-information (which belongs to the GNSS signal currently being received).

According to a further aspect, a computer program is proposed for implementing a method presented here. In other words, this relates in particular to a computer program (product), comprising commands which during the execution of the program by a computer, cause it to execute a method described here.

According to further aspect, a machine-readable storage medium is proposed, on which the computer program proposed here is deposited or stored. Typically, the machine-readable storage medium is a computer-readable data carrier.

According to a further aspect, a localization device for a vehicle is proposed, comprising: a GNSS-based localization module for determining first position information based on GNSS measurements, a feature-based localization module for determining second position information on the basis of at least one feature information item from a feature-based localization map, an independence assessment module for determining independence information on the basis of at least one GNSS-related meta-information item associated with the feature information, which allows an inference to be drawn about the GNSS situation on which the generation of the feature information was based, a fusion module for determining a localization result using the first position information and the second position information and taking the independence information into account.

The vehicle can be a motor vehicle, such as an automobile. The respective modules can be implemented in the localization device either physically or functionally, for example by means of an appropriate software architecture.

According to an advantageous embodiment, the localization device is configured to carry out a method described here. For example, the localization device can comprise a computer and/or a control unit (controller) that can execute commands to carry out the method. To do this, for example, the computer or control unit can execute the specified computer program. For example, the computer or control unit can access the specified storage medium in order to be able to execute the computer program.

For example, the localization device may be a component of a motion and position sensor that is or can be arranged, in particular, in or on a vehicle, or may be connected to such a sensor for information exchange. In this context, it may be provided that, for example, a GNSS sensor and/or the localization device are components of the motion and position sensor.

The details, features and advantageous embodiments discussed in connection with the method for generating may also occur accordingly in the method for localization and/or the computer program and/or the storage medium and/or the localization device presented here, and vice versa. In this respect reference is made to the comments made there for further characterization of the features in their full extent.

BRIEF DESCRIPTION OF THE DRAWINGS

The solution presented here as well as its technical background will be explained in more detail below on the basis of the figures. It should be noted that the disclosure is not intended to be limited by the exemplary embodiments. In particular, unless explicitly indicated otherwise, it is also possible to extract partial aspects of the facts explained in the figures and to combine them with other components and/or information from other figures and/or the present description. In the schematic drawings.

DETAILED DESCRIPTION

Figure 1:
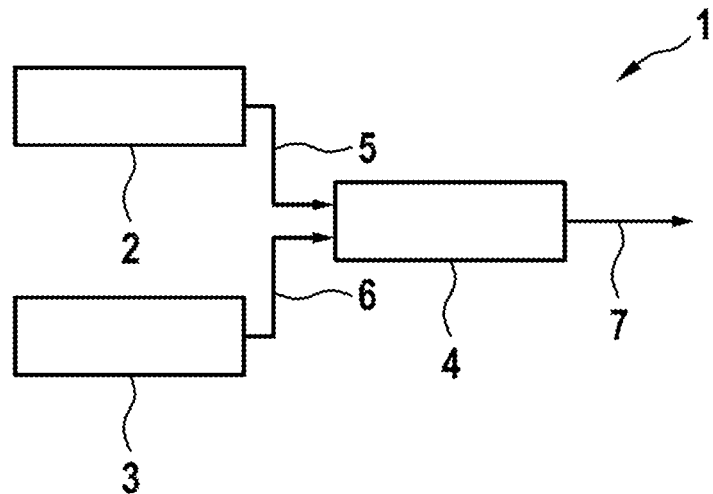
FIG. 1 shows an example structure of a localization system according to the prior art.

FIG. 1 shows a schematic illustration of an exemplary structure of a localization device 1 according to the prior art. This typically comprises a GNSS-based localization module 2, a feature-based localization module 3, and a fusion module 4.

This allows a fusion of vehicle position estimates from different vehicle localization modalities to be carried out. In this context, first position information 5 from the GNSS-based localization module 2 and second position information 6 from the feature-based localization module 3 are fed directly to the fusion module 4, which uses them to determine a localization result 7. However, the independence of the localization paths used is not adequately taken into account.

Current and future automated (AD) and assisted (DA) vehicle systems rely to a large extent on additional information from digital maps. This means that increasingly complex driving tasks can be handled automatically on the basis of a reduced set of sensors. The use of map information enables the localization of the vehicle (position and orientation) relative to the map used.

In safety-related functions, a combined localization solution based on independent localization paths is usually considered. Typical combinations of localization paths are the GNSS-based localization and the feature-based localization. The two localization paths should be as independent of each other as possible. However, this independence may be adversely affected in particular by the use of GNSS data for map creation.

In the context of the prior art, for example, it has been observed that the use of GNSS data in map creation can lead to the loss of independence of feature-based and GNSS-based localization. This can lead to critical system failures and should be avoided.

Figure 2:
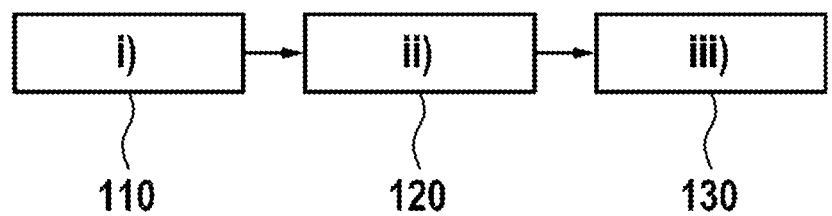
FIG. 2 shows an exemplary sequence of a method presented here.

FIG. 2 shows a schematic diagram of an exemplary sequence of a method presented here. The method is used for generating a feature-based localization map for a GNSS-based and/or feature-based localization. The sequence of steps i), ii) and iii) shown with blocks 110, 120, and 130 is exemplary and can be performed, for example, at least once in the order shown in order to carry out the method.

In block 110, feature information for the feature-based localization map is generated according to step i) using at least one GNSS information item. In block 120, according to step ii), GNSS-related meta-information is generated that allows inferences to be drawn about the GNSS situation on which the generation of the feature information was based. In block 130, in accordance with step iii) the GNSS-related meta-information generated in step ii) is associated with the feature information generated in step i).

Figure 3:
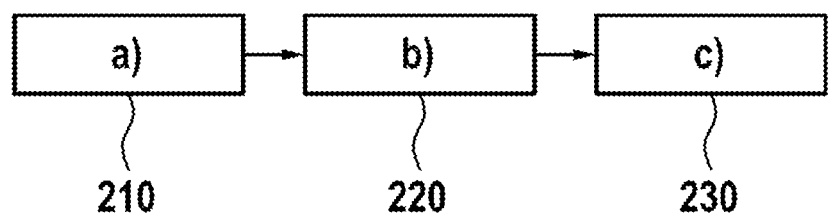
FIG. 3 shows an exemplary sequence of a further method presented here.

FIG. 3 shows a schematic diagram of an exemplary sequence of a further method presented here. The method is used for GNSS-based and/or feature-based localization. The sequence of steps a), b) and c) illustrated by the blocks 210, 220, and 230 is exemplary and can be iterated, for example, at least once in the order shown in order to carry out the method.

In block 210, GNSS signals are received from GNSS satellites in accordance with step a). In block 220, in accordance with step b) at least one feature information item from a feature-based localization map is read in, wherein at least one GNSS-related meta-information item associated with the feature information is additionally read in, which allows an inference to be drawn about the GNSS situation on which the generation of the feature information was based. In block 230, in accordance with step c) a GNSS-based and/or feature-based localization is carried out using the received GNSS signals and/or the at least one feature information item and taking into account the at least one GNSS-related meta-information item associated with the feature information.

In the method described here (FIG. 3) it is particularly advantageous if the feature-based localization map was generated with the method described above (FIG. 2).

The method can advantageously include evaluating the trustworthiness of the localization result. In this context, it is also possible to determine the trustworthiness of the feature-based localization map. The trustworthiness of the localization result and/or the localization map can be determined, in particular, depending on the at least one GNSS-related meta-information item associated with the feature information. For example, the trustworthiness can be provided in the form of an integrity measure, such as a so-called integrity level.

In addition, the method can include determining a measure of the independence of the GNSS-based localization from the feature-based localization, taking into account the at least one GNSS-related meta-information item associated with the feature information. The measure of the independence of the GNSS-based localization from the feature-based localization can also be determined by taking into account at least one GNSS-related meta-information item associated with the GNSS signals. For example, in this context the at least one GNSS-related meta-information item associated with the feature information and the at least one GNSS-related meta-information item associated with the GNSS signals can be compared.

Figure 4:
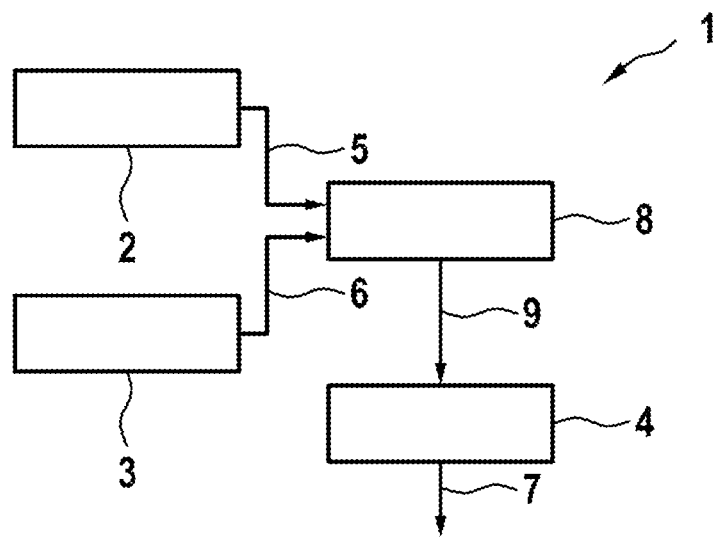
FIG. 4 shows an exemplary structure of the localization device presented here.

FIG. 4 shows a schematic diagram of an exemplary structure of the localization device 1 presented here. The localization device 1 is suitable for deployment in a vehicle 10 or is provided and configured for the same.

The localization device 1 comprises a GNSS-based localization module 2 for determining first position information 5 based on GNSS measurements. The localization device 1 also comprises a feature-based localization module 3 for determining second position information 6 based on at least one feature information item from a feature-based localization map. In addition, the localization device 1 comprises an independence assessment module 8 for determining independence information 9 on the basis of at least one GNSS-related meta-information item associated with the feature information, which allows an inference to be drawn about the GNSS situation on which the generation of the feature information was based. In addition, the localization device 1 comprises a fusion module 4 for determining a localization result 7 using the first position information 5 and the second position information 6 and taking into account the independence information 9.

A particular advantage of the localization device 1 is the independence assessment module 8. In particular, it assesses the independence of the localization outputs on the basis of GNSS-related meta-information.

The localization device 1 can be configured to carry out the method described above, for example.

The methods described and the localization device 1 can each assist in ensuring the independence of (redundant) GNSS-based and feature-based localization paths in the most secure localization systems possible. A particular advantage of the methods described here and of the localization device 1 is in the generation, storage and/or use of GNSS-related meta-information in feature localization maps.

Examples of GNSS-related meta-information that can be used here are: satellite type and constellation, satellite geometry (e.g. DOP information), positioning type (code only, float ambiguity resolution, integer ambiguity resolution), only GNSS (and/or sensor fusion) position deviation information, percentage of discarded pseudo-range and carrier-phase measurements, RMS of the measuring residuals, variability of the residuals, signal-to-noise information, multipath display, and cycle slips.

A particular advantage is the use of GNSS-related meta-information in the independence assessment module 8 during operation of the localization device 1.

The feature-based localization module 3 can load a feature map segment (example item of feature information) that matches the current map-relative vehicle position and orientation (pose). The (feature-based) vehicle pose (second position information 6) can then advantageously be estimated using current sensor measurements and the loaded feature map segment. Appropriate sensor measurements can be carried out, for example, by sensors of the vehicle, such as a GNSS sensor, inertial sensor and/or environment sensor (camera, radar, lidar, ultrasound, etc.).

The vehicle position estimate thus determined (second position information 6) can then be sent to the independence assessment module 8 together with at least one GNSS-related meta-information item associated with the feature information.

In addition, the GNSS-based localization module 2 can send GNSS meta-information and the current (GNSS-based) vehicle position estimate (first position information 5) to the independence assessment module 8.

The independence assessment module 8 can evaluate the meta-information and advantageously assesses the degree of independence between the GNSS-based and feature-based localization inputs. The result can advantageously be expressed by an independence flag.

If the independence flag indicates a sufficiently high degree of independence, the two vehicle position estimates can be merged in the fusion module 4. If a dependency has been detected by the independence assessment module 8, it may be provided that the fusion module 4 will only provide localization results with (correspondingly) low or correspondingly reduced integrity. A correspondingly low integrity may lead to a deterioration of the DA/AD function when using the localization result.

For example, the GNSS constellation geometry during collection of the GNSS data used for the mapping and the satellite geometry or GNSS constellation geometry used in the GNSS-based localization could be similar and rather poor. Accordingly, a significant coupling/loss of independence between the two localization paths could be expected and a negative impact on safety cannot be ruled out. In this case, the independence of the two localization paths cannot be assumed. Therefore, in such a case, a high-integrity vehicle localization result might not be available to the DA/AD function.

In another example, the GNSS signal could be affected by multipath propagation, i.e. reflections from nearby obstacles, resulting in erroneous signal delays and thus in increased residuals and wide fluctuations in the signal strength. Both in the metadata and in the data actually observed in such an exemplary case, the respective quality indicators such as residuals and CN0 may reflect the fact that the vehicle is in a difficult environment. In this example, a high level of integrity cannot be guaranteed for either the GNSS-based vehicle localization or for the map data, which was originally calculated based on a poor GNSS signal quality.

Figure 5:
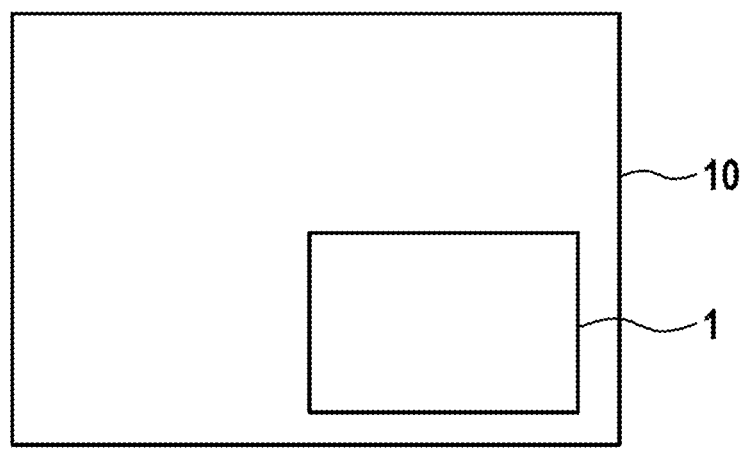
FIG. 5 shows a vehicle with a localization device as described here.

FIG. 5 shows a schematic drawing of a vehicle 10 with a localization device 1 described here. The vehicle 10 could be a car, for example, which is preferably configured for at least partially automated driving.

The methods described and the localization device described can assist in achieving one or more of the following advantages: (i) independence of GNSS-based and feature-based localization paths without the need to exclude GNSS data from the feature map creation; (ii) if the independence between the mapping (and therefore the feature-based localization) and the GNSS-based localization cannot be achieved, this problem can also be addressed in the vehicle. In such cases, the methods specified here, as well as the localization device, can be used to improve the independence and provide a vehicle localization function of the highest integrity for the AD/DA function/vehicle system; (iii) the independence requirements of the map can be significantly reduced. This means that GNSS data can be used to any desired extent in the mapping; and (iv) using the methods specified here as well as the localization device, the potentially safety-relevant independence requirement can be advantageously converted into an availability requirement. This is possible in particular because the safety requirement can be shifted towards the independence assessment module and thus away from the feature map. This can enhance the system design as it offers additional design options.

What is claimed is:

1. A method for global navigation satellite system (GNSS)-based localization and a feature-based localization, comprising:
    receiving GNSS signals from GNSS satellites;
    determining at least one current GNSS-related meta-information item based on the received GNSS signals;
    reading in at least one feature information item from a feature-based localization map;
    reading in at least one stored GNSS-related meta-information item associated with the at least one feature information item from the feature-based localization map;
    carrying out the GNSS-based localization and the feature-based localization using the received GNSS signals and and/or the at least one feature information item; and
    determining a measure of an independence of the GNSS-based localization from the feature-based localization by comparing the at least one current GNSS-related meta-information item with the at least one stored GNSS-related meta-information item,
    wherein the current GNSS-related meta-information item and the stored GNSS-related meta-information item each include at least one of (i) satellite type and constellation information, and (ii) satellite geometry including dilution of precision (DOP) information.

2. The method according to claim 1, further comprising:
    generating the feature-based localization map by:
        generating feature information for the feature-based localization map using at least one GNSS information; and
        assigning the GNSS-related meta-information to the generated feature information.

3. The method according to claim 1, further comprising:
    evaluating a trustworthiness of the GNSS-based localization and/or the feature-based localization using the determined measure of independence.

4. The method according to claim 1, wherein a computer program is configured to carry out the method.

5. The method according to claim 4, wherein the computer program is stored on a non-transitory machine-readable storage medium.

6. The method according to claim 1, wherein the measure of independence is used to determine a plausibility of at least one of the GNSS-based localization and the feature-based localization.

7. A localization device for a vehicle, comprising:
    a global navigation satellite system (GNSS)-based localization module configured to determine (i) first position information based on GNSS measurements, and (ii) at least one current GNSS-related meta-information item based on the GNSS measurements;
    a feature-based localization module configured to determine (i) second position information based on at least one feature information item from a feature-based localization map, and (ii) at least one stored GNSS-related meta-information item associated with the at least one feature information item from the feature-based localization map;

an independence assessment module configured to determine independence information by comparing the at least one current GNSS-related meta-information item with the at least one stored GNSS-related meta-information item; and
a fusion module configured to obtain a localization result using the first position information, the second position information, and the independence information,
wherein the current GNSS-related meta-information item and the stored GNSS-related meta-information item each include at least one of (i) satellite type and constellation information, and (ii) satellite geometry including dilution of precision (DOP) information.

8. The localization device for a vehicle according to claim 7, wherein the fusion module is configured to use the independence information for plausibility checking of the localization result.

\* \* \* \* \*